United States Patent [19]
Nielsen

[11] Patent Number: 5,903,727
[45] Date of Patent: May 11, 1999

[54] PROCESSING HTML TO EMBED SOUND IN A WEB PAGE

[75] Inventor: Jakob Nielsen, Atherton, Calif.

[73] Assignee: Sun Microsystems, Inc., Palo Alto, Calif.

[21] Appl. No.: 08/665,487

[22] Filed: Jun. 18, 1996

[51] Int. Cl.⁶ .................................................. G06F 13/00
[52] U.S. Cl. .............................. 395/200.42; 395/200.33; 395/200.47; 395/200.48
[58] Field of Search .......................... 395/200.41–200.43, 395/200.46–200.5, 356–357, 200, 200.33

[56] References Cited

U.S. PATENT DOCUMENTS

| | | | |
|---|---|---|---|
| 5,293,385 | 3/1994 | Hary | 395/183.14 |
| 5,572,643 | 11/1996 | Judson | 395/200.48 |
| 5,606,359 | 2/1997 | Youden et al. | 348/7 |
| 5,659,729 | 8/1997 | Nielsen | 707/3 |
| 5,715,404 | 2/1998 | Katseff et al. | 395/200.62 |
| 5,737,533 | 4/1998 | De Honda | 395/200.49 |
| 5,802,292 | 9/1998 | Mogul | 395/200.49 |

OTHER PUBLICATIONS

John W. Mezer, IEEE, Oct. 1991, pp. 21–22 "Hypertext a New Dimension in Data Integration.".
Ronald J. Vetter et al, IEEE, Oct. 1994, pp. 49–57 "Mosaic and the World Wide Web.".
Venkata N. Padmanabhan, "Improving World Wild Web Latency", Computer Science Devision–University of California at Berkeley, Report No. UCB/CSD–95–875, pp. 1–24, May 1995.
Microsoft Internet Explorer 2.0 for Windows 95, 1995. "http://www.microsoft.com/ie/win95/default.htm.".

*Primary Examiner*—Parshotam S. Lall
*Assistant Examiner*—Bharat Barot
*Attorney, Agent, or Firm*—Graham & James LLP

[57] ABSTRACT

A method and apparatus that allows a Web page designer to specify that an audio file linked to a Web page should be prefetched before user input is accepted. Web browser software prefetches the audio file if there is enough room in a temporary memory to store the file. The invention also allows a Web page designer to specify the text over which the user must place the cursor to play the audio file. When the temporary memory is full and an audio file needs to be prefetched, the browser deletes files from the temporary memory until there is enough room in the temporary memory for the prefetched audio file. Files are deleted in a least-recently-referenced, first-out order.

17 Claims, 8 Drawing Sheets

Fig. 3
Preprocessing by Browser

Browser Displays a Page

PROCESSING HTML TO EMBED SOUND IN A WEB PAGE

FIELD OF THE INVENTION

This application relates to the World Wide Web and, in particular, to a software tool for reducing the time required to play sounds in conjunction with documents on the Web.

BACKGROUND OF THE INVENTION

The past several years have seen an explosive growth of the internet, and specifically, in the growth of the World Wide Web (hereafter "the Web"). The Web is built around a network of "server" computers which exchange requests and data from each other using the hypertext transfer protocol ("http"). A human designer designs the layout of a Web page and specifies the layout of the page using HTML ("Hypertext Markup Language"). Several versions of HTML are currently in existence. Examples include HTML versions 2.0 and 3.0, as specified by the WWW Consortium of MIT.

A user views a Web page using one of a number of commercially available "browser" programs. The browser submits an appropriate http request to establish a communications link with a Web server of the network. A typical http request references a Web page by its unique Uniform Resource Locator ("URL"). A URL identifies the Web server hosting that Web page, so that an http request for access to the Web page can be routed to the appropriate Web server for handling. Web pages can also be linked graphically to each other.

Ever since the Mosaic browser, which was developed by the University of Illinois, it has been possible to have a sound effect as the destination for a hypertext link on the Web. When the user clicks on the area associated with the sound, the browser retrieves an audio file from the remote server and plays it. Early browsers actually played audio files by passing them to so-called "helper applications," but current browsers have audio players built in. Unfortunately, this standard approach (retrieving the audio file at a user's request) is ill-suited for small sound effects (e.g., a bird call or a name pronunciation) because of network latency. The user does not get to hear the sound until several seconds after he or she has clicked on the link. Experimentation has shown that a user needs to get the result of traversing a hypertext link within a single second for the user to feel that he or she is navigating freely.

A second approach supports so-called "background sounds" that will play automatically as soon as the browser has finished downloading a page. The problem with this approach is that the sound will be played under all circumstances, and thus not under user control when the user desires to hear a specific sound. Also, no more than a single sound can be associated with the page.

SUMMARY OF THE INVENTION

The present invention overcomes the problems and disadvantages of the prior art by adding an extension to HTML that specifies that certain audio files should be prefetched before user input is accepted for a displayed Web page. The invention also enables the designer to specify that only certain audio files should be prefetched. For example, it is not always desirable to prefetch a very large audio file because it would take too much time. The HTML format allows a Web page designer to specify the information over which the user must place the cursor to activate the prefetched audio output. The invention also includes browser software that can prefetch audio files in accordance with instructions in the HTML.

In accordance with the purpose of the invention, as embodied and broadly described herein the invention is a method of processing HTML that describes a Web page, comprising the steps performed by a data processing system, of receiving HTML describing the Web page; reviewing the HTML to locate a SOUND attribute in the HTML, the SOUND attribute being associated with an audio file; prefetching the audio file; and storing the prefetched audio file in a memory of the data processing system.

In further accordance with the purpose of this invention, as embodied and broadly described herein the invention is a computer system that processes HTML describing a Web page, the computer system having a memory, comprising: an HTML receiving portion that receives the HTML describing the Web page; a reviewing portion that reviews the HTML to locate a SOUND attribute in the HTML, the SOUND attribute being associated with an audio file; a prefetch portion that prefetches the audio file; and a storage portion that stores the prefetched audio file in the memory of the computer system.

Objects and advantages of the invention will be set forth in part in the description which follows and in part will be obvious from the description or may be learned by practice of the invention. The objects and advantages of the invention will be realized and attained by means of the elements and combinations particularly pointed out in the appended claims.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 5(*a*) shows an example of contents of a temporary memory of FIG. 1.

FIG. 5(*b*) shows an example of contents of a temporary memory of FIG. 1.

FIG. 5(*c*) shows an example of a data structure stored in a memory of FIG. 1.

DETAILED DESCRIPTION OF THE PREFERRED EMBODIMENT

Reference will now be made in detail to a preferred embodiment of the invention, an example of which is illustrated in the accompanying drawings. Wherever possible, the same reference numbers will be used throughout the drawings to refer to the same or like parts.

Figure 1:
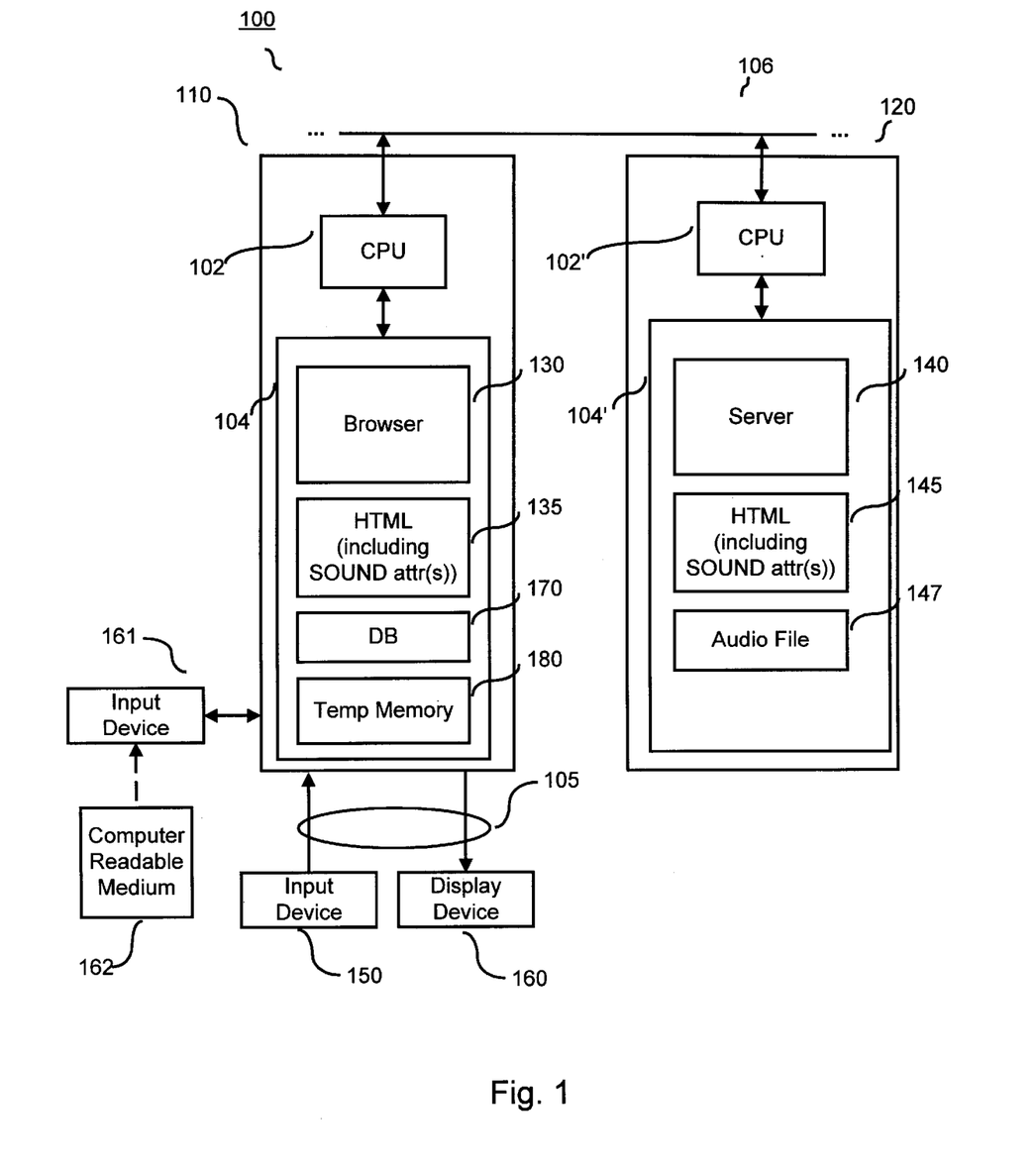
FIG. 1 is a block diagram of a computer system in accordance with a preferred embodiment of the present invention.

FIG. 1 is a block diagram of a computer system 100 in accordance with a preferred embodiment of the present invention. Computer system 100 includes a first computer 110 and a second computer 120. First computer 110 and second computer 120 are connected together via line 106, which can be, for example, a LAN, a WAN, or an internet connection. Line 106 can also represent a wireless connection, such as a cellular network connection.

First computer 110 includes a CPU 102; a memory 104; input/output lines 105; an input device 150, such as a keyboard or mouse; and a display device 160, such as a display terminal. First computer 110 also includes an input device 161 that reads computer instructions stored on computer readable medium 162. These instructions are the instructions of e.g., browser software 130. Memory 104 of first computer 110 includes browser software 130, Hypertext Markup Language (HTML) 135, and a database or data structure (DB) 170. A portion of memory 104 is designated as temporary memory 180. A person of ordinary skill in the art will understand that memory 104 also contains additional information, such as application programs, operating systems, data, etc., which are not shown in FIG. 1 for the sake of clarity.

Second computer 120 includes a CPU 102' and a memory 104'. Memory 104' of second computer 120 includes server software 140, Hypertext Markup Language (HTML) 145, and an audio file 147. HTML 135 in the memory of first computer 110 was downloaded over line 106 from HTML 145 of second computer 120. A person of ordinary skill in the art will understand that memory 104' also contains additional information, such as application programs, operating systems, data, etc., which are not shown in FIG. 1 for the sake of clarity. Server 140, HTML 145, and audio file 147 can also be located in memory 104 of first computer 110.

It will be understood by a person of ordinary skill in the art that computer system 100 can also include numerous elements not shown in the FIG. 1 for the sake of clarity, such as disk drives, keyboards, display devices, network connections, additional memory, additional CPUs, LANs, input/output lines, etc. A preferred embodiment of the invention runs under the Solaris operating system, Version 2.5. Solaris is a registered trademark of Sun Microsystems, Inc.

The present invention speeds up the process of playing sound in conjunction with Web pages. In the present invention, some audio files are specified in the HTML for a Web page with a attribute indicating that they should be prefetched if possible. When a Web page is first displayed, the browser prefetches as many of these audio files as will fit in temporary memory. Thus, when the user activates an audio file (usually by clicking on text or graphics linked to the audio file), the prefetched audio file can be played immediately without waiting for the time normally required to download the audio file over line 106. In a preferred embodiment, Web pages specified using the present invention can still be displayed using Web browsers that have not been enhanced to recognize HTML SOUND attributes because these browsers will simply ignore the SOUND attribute.

Figure 2:
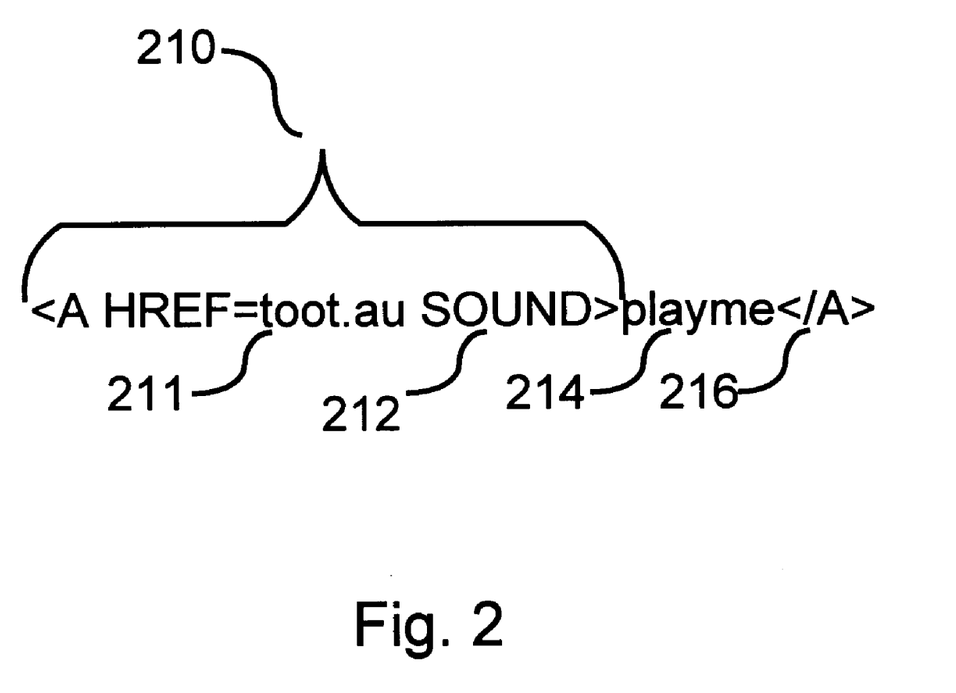
FIG. 2 shows a format of a HyperText Markup Language (HTML) element in accordance with the embodiment of FIG. 1.

FIG. 2 shows an example of a format of an anchor element in accordance with a preferred embodiment of the present invention. The format of conventional HTML is described in, for example, Morris, "HTML for Fun and Profit," SunSoft Press 1995, which is herein incorporated by reference. The format includes a first text string 210 surrounded by brackets ("<" and ">"). The characters "A HREF=" are followed by a URL 211 of an audio file (e.g., toot.au). The audio file can be of any appropriate format, such as .AU or .WAV formats. The attribute "SOUND" 212 indicates that the audio file should be prefetched.

Next, a second text string 214 (e.g., playme) identifies information that is displayed on the Web page and that should be linked to the audio file. The string 214 can identify any information that has a visual appearance on display device 160, including images, literal character strings animations (given a system of sufficient response time) and JAVA applets. JAVA is a registered trademark of Sun Microsystems, Inc. Thus, for example, audio output can be associated with an icon if the displayed information identifies a file containing the graphical information of an icon. Next, a third text string 216 consists of the string "</A>" to indicate the end of the SOUND element.

Figure 3:
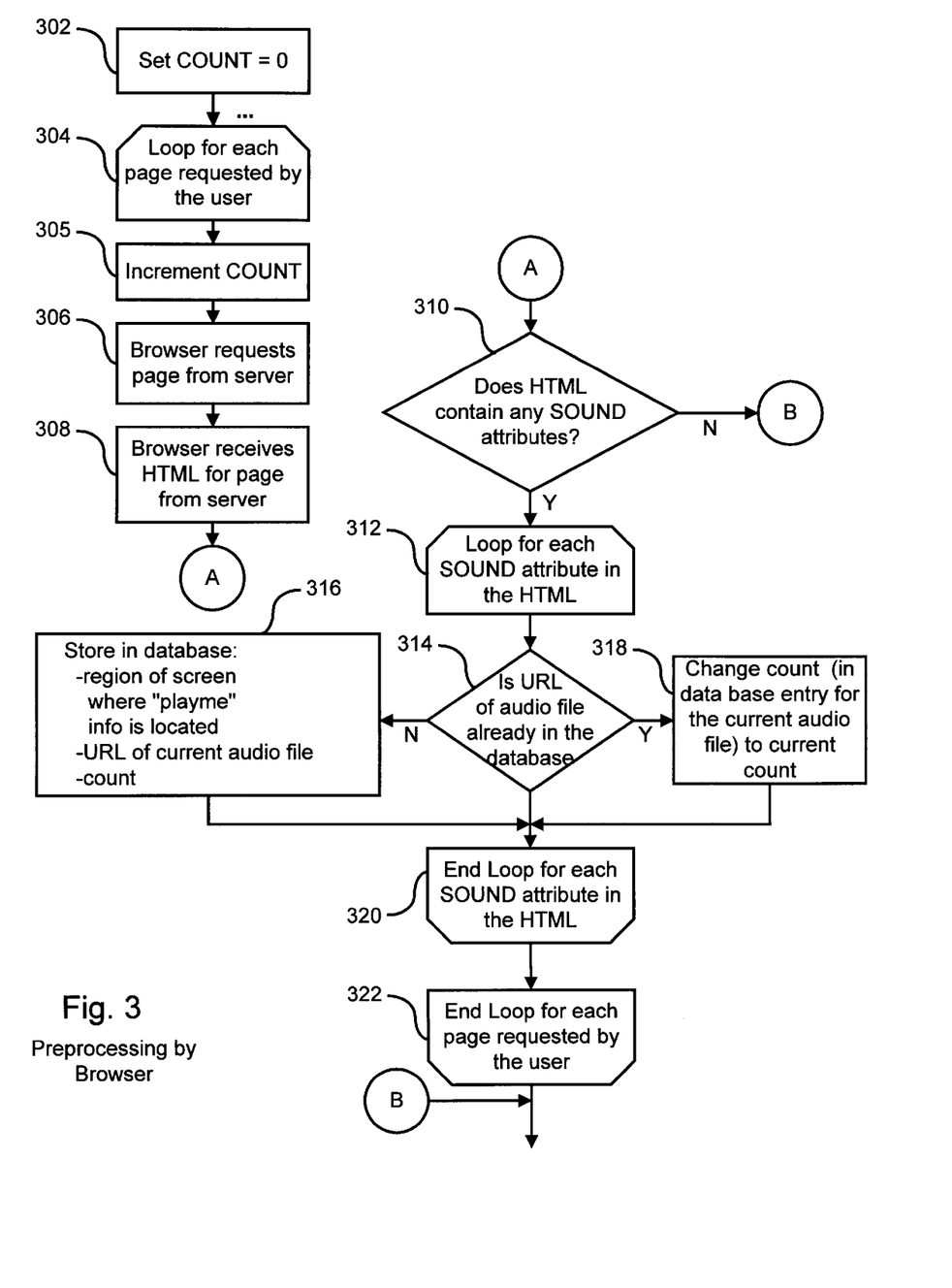
FIG. 3 is a flow chart showing steps performed by browser software prior to displaying a Web page.

FIG. 3 is a flow chart showing steps performed by browser software 130 prior to displaying a Web page. It will be understood by persons of ordinary skill in the art that the steps of flow charts in this document are performed by CPU 102 of FIG. 1 executing the instructions of browser 130 in accordance with HTML 135. Initially, in step 302, a COUNT variable in memory 104 is set to "0." COUNT is incremented each time a new page is viewed via the browser and, therefore, keeps track of a current page number that is currently being viewed. A page having a lowest associated COUNT value was viewed the longest ago in time. Step 304 represents the top of a loop performed for each Web page viewed. In step 305, the COUNT variable is incremented so that its value represents the new page to be viewed. In step 306, the browser requests HTML 145 for a current page from server 140. In step 308, server 140 sends the requested HTML to the browser where it is stored as HTML 135 in memory 104. In step 310, the browser determines whether HTML 135 contains any anchor link elements with SOUND attributes. If so, certain initialization steps 312–322 are performed.

Step 312 is the top of a loop performed for each anchor link element in HTML 135 that has the format shown in FIG. 2. If, in step 314, the audio file specified in the anchor link element has not been prefetched, then, in step 316, information about the audio file is stored in a data structure (such as a database or table). (If the audio file has already been prefetched, its URL is already present in the data structure, as discussed below). The stored information includes an identification of the region of the screen where the "playme" information 214 is located, the URL of the audio file, and the current COUNT value.

If the audio file has been prefetched then, in step 318, the old COUNT value for the audio file in the database is replaced by the current COUNT value to indicate that the audio file is referenced on the current page. Steps 320 and 322 represent the loop ends.

Figure 4A:
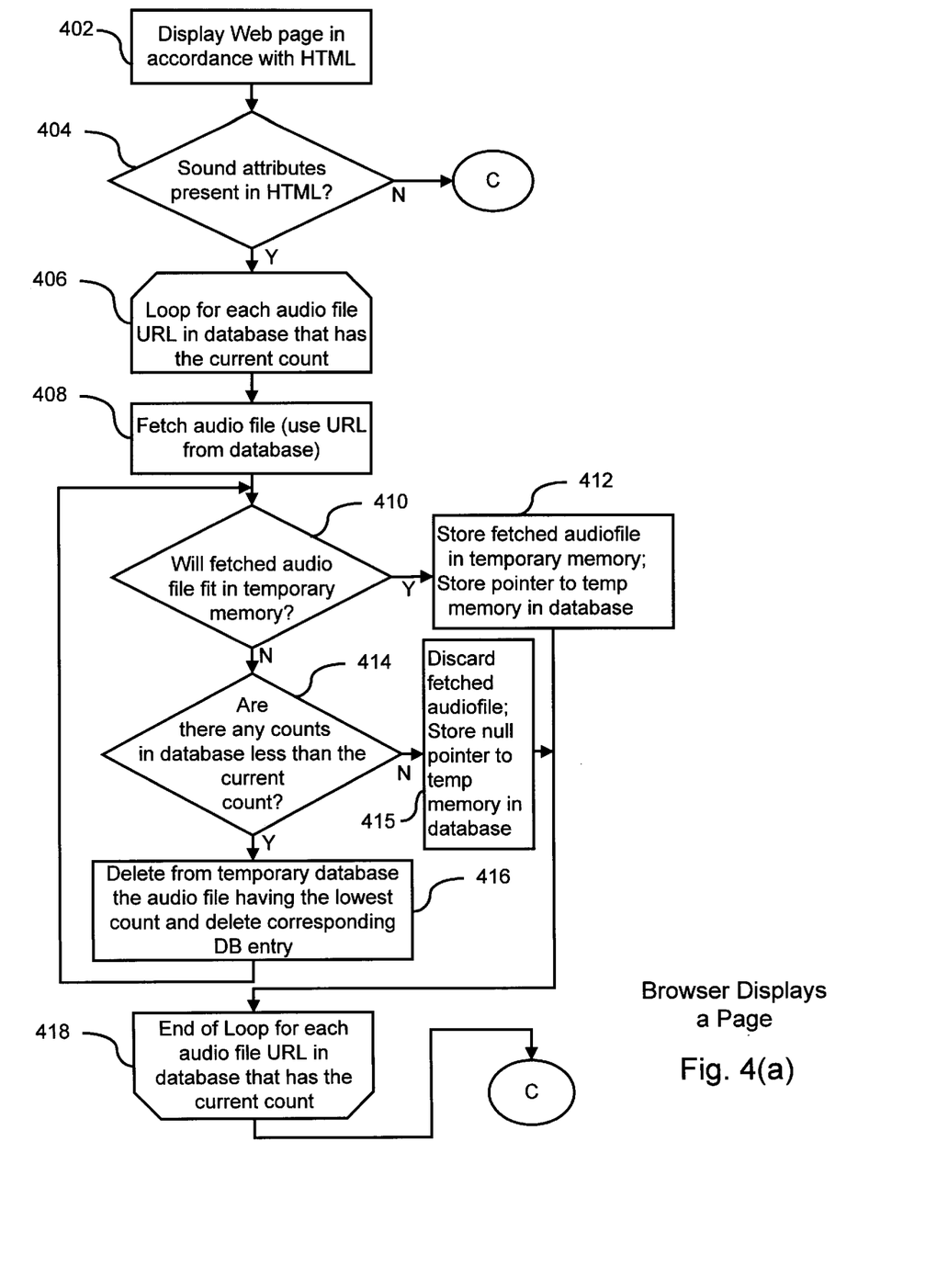
FIG. 4 is a flow chart showing steps performed by the browser software to display a Web page.
Figure 4B:
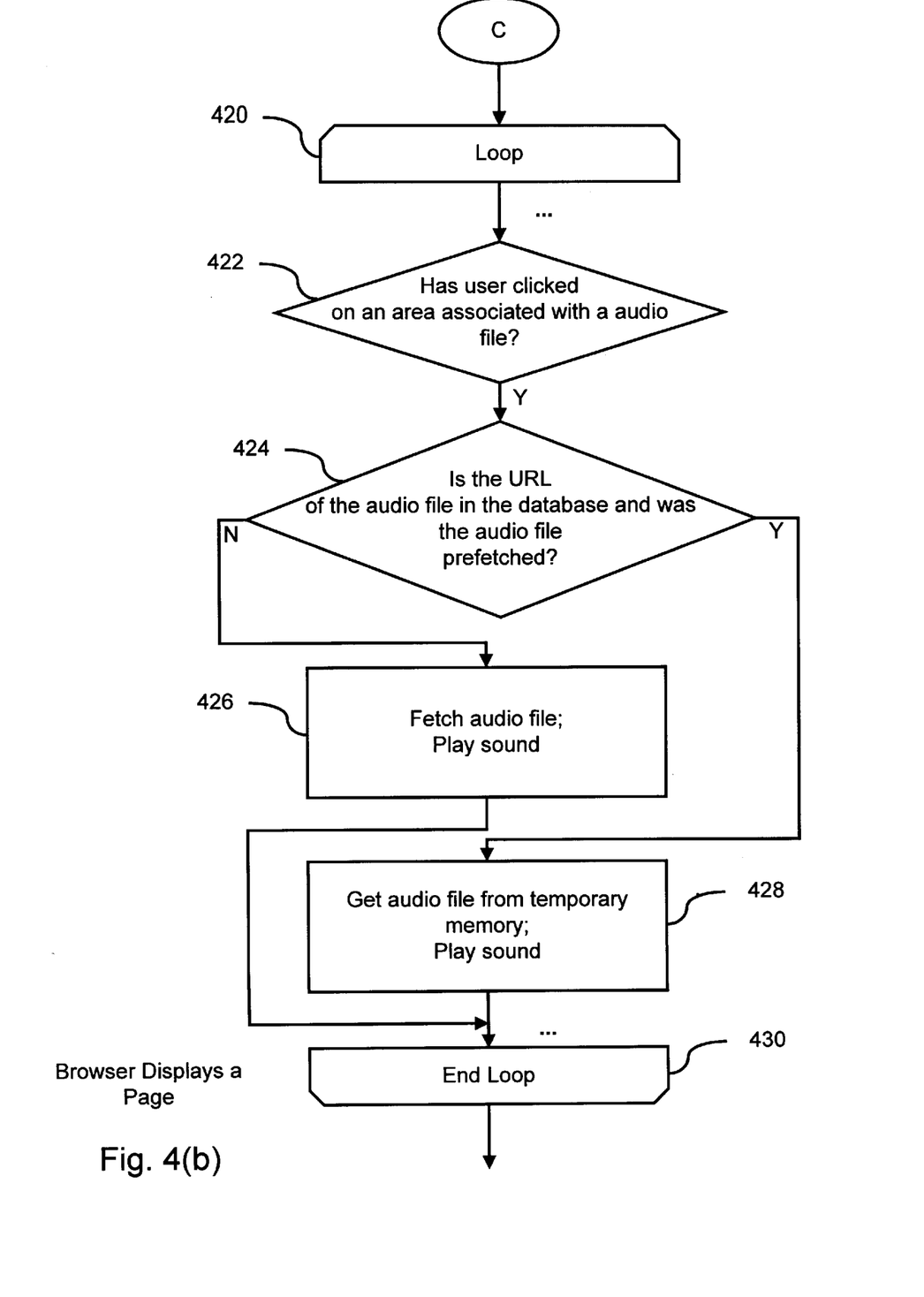

FIG. 4 is a flow chart showing steps performed by browser 130 to display a Web page. In step 402, the page is displayed on display device 160 in accordance with HTML 135, in a manner known to persons of ordinary skill in the art. It will be understood that there are other steps (not shown) that are performed by browser 130 to display a Web page and to accept input from the user. Many of these steps are not described herein to enhance the clarity of the example.

In step 404, if there are SOUND attributes present in HTML 135, steps 406–418 are performed. Step 406 is the top of a loop performed for each audio file URL in the data structure that has the current value of COUNT (i.e., for each audio file of the current page that was specified with a SOUND attribute). Step 408 fetches the audio file 147 specified by its URL in the data structure.

Memory 104 of FIG. 1 includes a temporary memory 180 of a predetermined size, such as one megabyte. In step 410, if the fetched audio file will fit in an unused portion of temporary memory 180, it is stored therein in step 412 and a pointer to its location in temporary memory is placed in the data structure. If the audio file will not fit in temporary memory, steps 410–416 remove audio files of pages viewed the longest time ago from temporary memory until the fetched audio file will fit. If, in step 414, only audio files for the current page remain in temporary memory and there still is not room, the fetched audio file is discarded in step 415 and control passes to step 418. Step 418 represents a loop end.

Steps 420–430 represent a loop performed to receive user input (such as mouse clicks) and to respond thereto. In step 422, if the user clicks on an area link associated with an audio file, then steps 424–428 are performed. In step 424, if the audio file was specified in HTML 135 with a SOUND attribute and if the audio file actually was prefetched and stored in step 412 then, in step 428, the audio is retrieved from the temporary memory and played. Because retrieval from temporary memory does not involve an access over line 106, it occurs very fast and there is a very short period of time between the user's click and the sound. In contrast, if the audio file was not specified in the HTML as prefetchable, or if there was no room in temporary memory to prefetch the audio file, the audio file 147 is fetched over line 106 in step 426 and played. Step 426 may involve for example, an internet access and as a general rule takes longer than step 428.

Figure 5A:
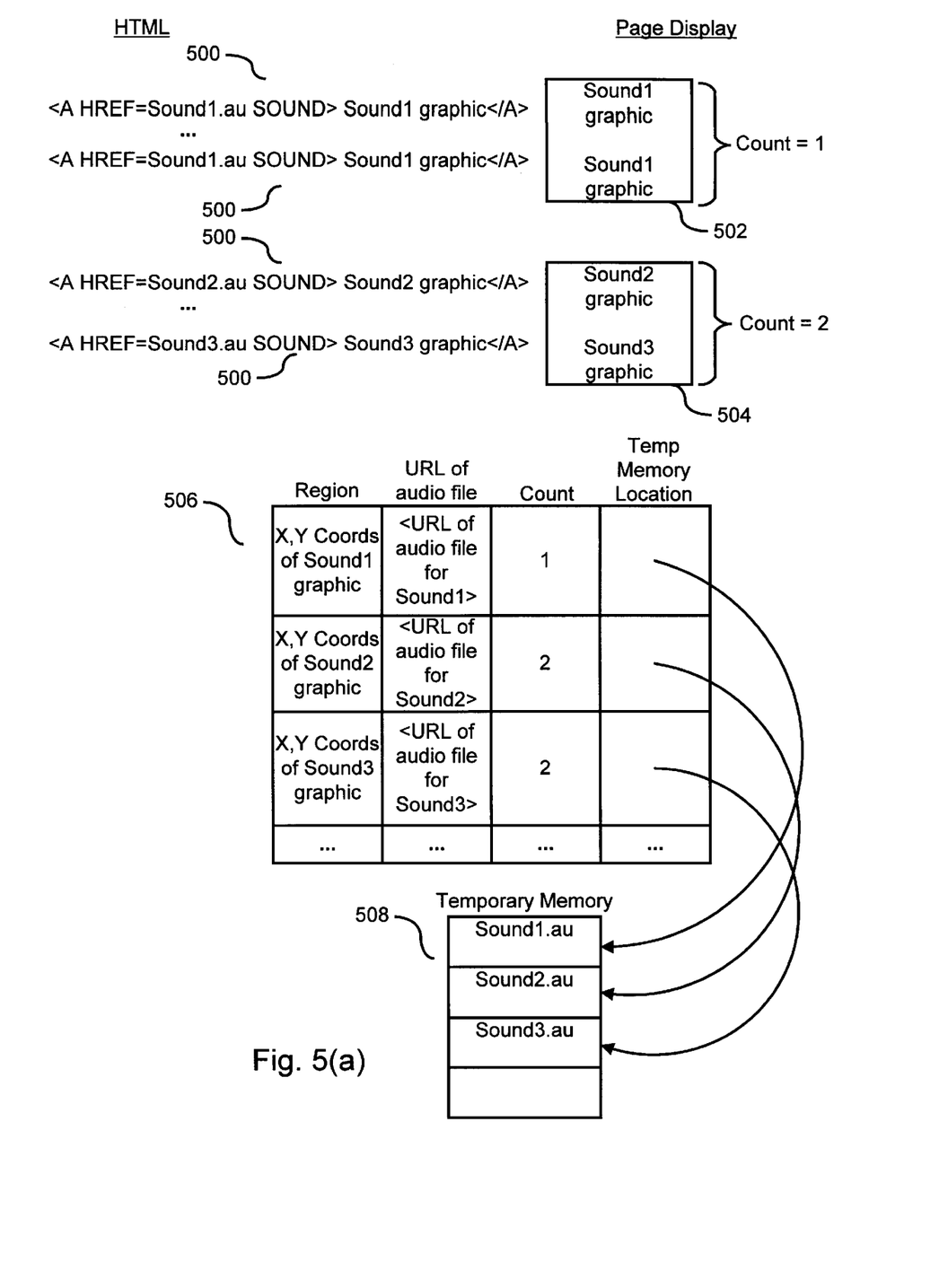
Figure 5B:
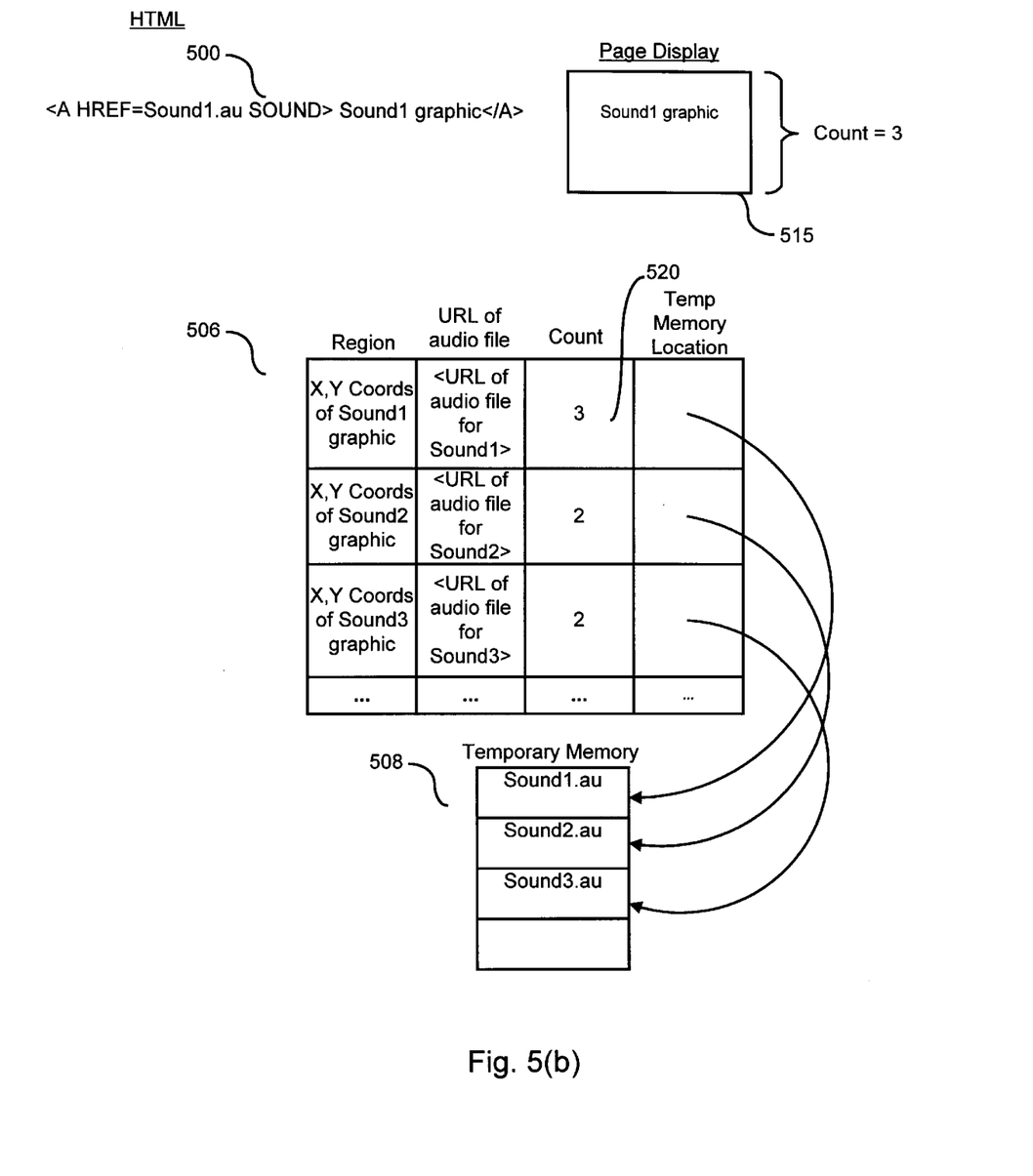
Figure 5C:
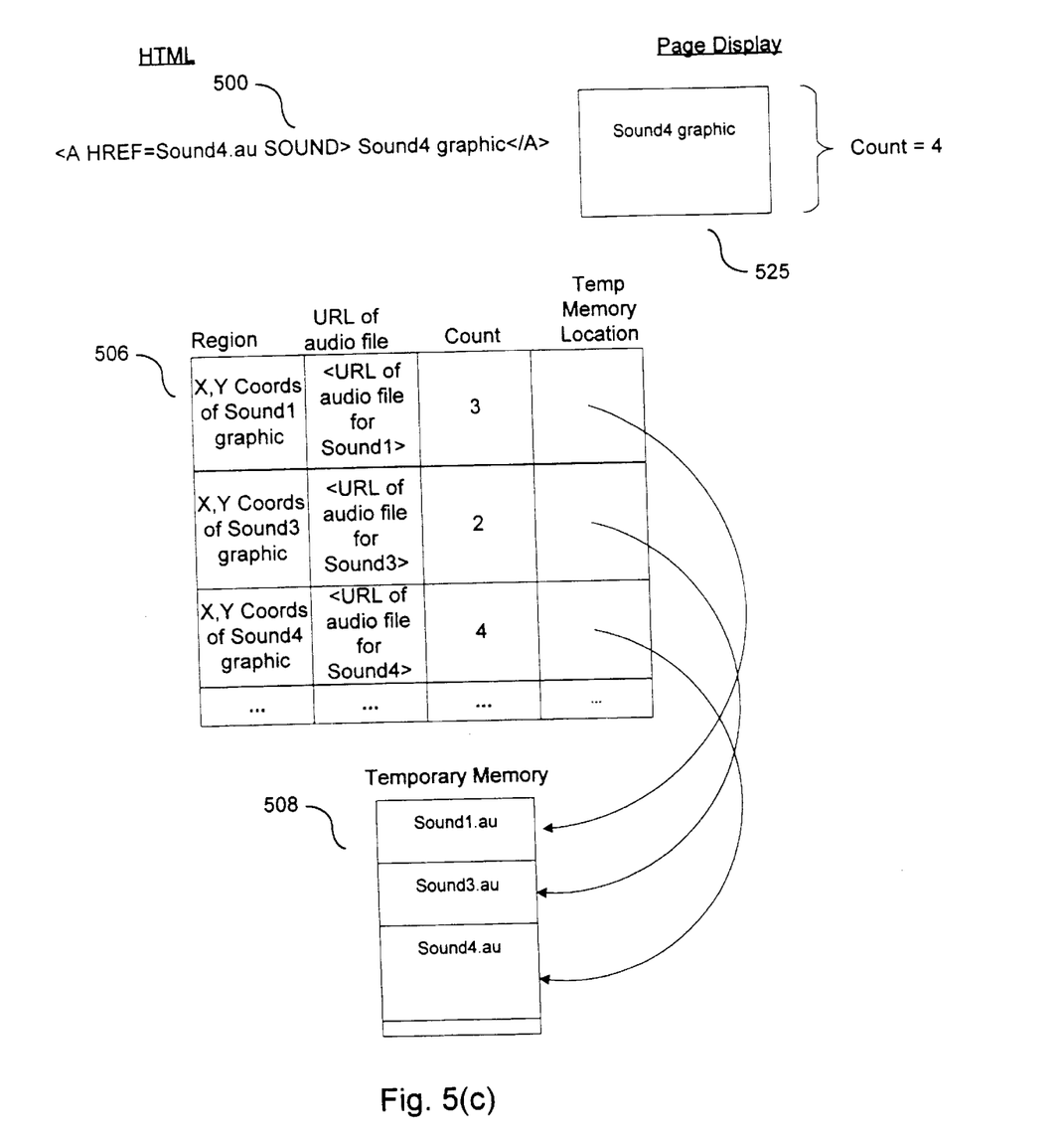

FIGS. 5(a) through 5(c) provide an example of prefetching audio files. As shown in the "HTML" column, audio files to be prefetched are specified using a SOUND attribute 500. The "Page Display" column indicates that the text graphic associated with each audio file is displayed on the Web page. In FIG. 5(a), the user has viewed two pages. A first page 502 has two instances of a link to an audio file Sound1.au. A second page 504 has a link to an audio file Sound2.au and a link to an audio file Sound3.au. In FIG. 5(a) a database 506 stores region, URL, COUNT value, and a temporary memory location for each audio file. The audio files have been prefetched and stored in temporary memory 508?

In FIG. 5(b), a new page 515 is viewed. The new page also has a link to audio file Sound1.au. Audio file Sound1.au was previously prefetched when page 502 of FIG. 5(a) was displayed. Thus, in accordance with step 318 of FIG. 3, the COUNT value 520 in database 506 for audio file Sound1.au is changed to the current COUNT value of "3" to indicate that the audio file was most recently referenced on third page 515.

In FIG. 5(c), a new page 525 is viewed. The new page has a link to an audio file Sound4.au. In the example, after Sound4.au was fetched over line 106, it was apparent that there was insufficient room in temporary memory 508 for the file. Thus, Sound2.au was removed from temporary memory 508 because it was the first file having a lowest COUNT value ("2") (See FIG. 5(b)). In the example, once Sound2.au was removed, there was room in temporary memory for Sound4.au and that file was stored in temporary memory 506 in accordance with step 412 of FIG. 4. Thus, in FIG. 5(c), audio files Sound1.au, Sound 3.au, and Sound 4.au have been prefetched and can be played immediately when the user selects their displayed links.

Prefetching is preferably performed using some scheme that allows many computer activities to progress in parallel. A preferred embodiment uses the multi-threading capability of Solaris 2.5 is the preferred means, but others can be used too. Thus, if the user issues any commands (e.g., to go to another page) before the download/prefetch is completed, then the computer will accept this input and perform the requested action.

Any audio file downloads in progress when the user issues a command to go to a new page will be treated as follows:

a) If the user uses a "open in new window" command (that is, the new page will open in a different window from that used to display the current page), then the sound downloads are temporarily suspended while the new page is downloaded and then resumed as soon as its HTML text has been downloaded.

b) If the user uses a "open in same window" command (that is, the new page will replace the current page and be displayed in the same window), then all sound downloads in progress are immediately terminated.

In summary, the present invention allows the designer of a web page to specify whether to prefetch audio files that are to be played when the user selects an associated text or graphic. If no SOUND attribute is present in the HTML, the audio file is not prefetched. It is desirable that the designer can specify which audio files to prefetch, since some audio files are very large. Such files would take too much space in the temporary memory.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method of processing HTML that describes a Web page, comprising the steps performed by a data processing system, of:

receiving HTML describing the Web page, the HTML describing the Web page including at least one SOUND attribute identifying at least one audio file associated with the Web page that should be prefetched;

reviewing the received HTML to locate the at least one SOUND attribute in the HTML;

prefetching automatically the audio file identified by the at least one SOUND attribute when during the reviewing step the SOUND attribute is located in the HTML; and storing the prefetched audio file in a memory of the data processing system to allow the audio file to be played immediately upon activation of the audio file by a user.

2. The method of claim 1, wherein the storing step includes the step of:

storing a current page number of the Web page in the memory in association with the prefetched audio file.

3. The method of claim 1 wherein the memory of the data processing system includes a temporary memory, wherein the storing step includes the step of storing the prefetched audio file in the temporary memory when there is room in the temporary memory for the prefetched audio file.

4. The method of claim 1 wherein the memory of the data processing system includes a temporary memory, wherein the storing step includes the step of deleting from the temporary memory a second audio file referenced in a least recently used Web page.

5. A method of displaying a Web page, comprising the steps performed by a data processing system, of:

receiving HTML describing the Web page, the HTML containing a SOUND attribute associated with an audio file identifying the audio file associated with the Web page that should be prefetched;

reviewing the received HTML to locate the SOUND attribute in the HTML;

prefetching automatically the audio file identified by the SOUND attribute in the HTML when during the reviewing step the SOUND attribute is located in the HTML;

storing the prefetched audio file in a memory of the data processing system to allow the audio file to be played immediately upon activation of the audio file by a user;

displaying the Web page in accordance with the HTML;

determining that a user has activated by the audio file by selecting a portion of the displayed Web page, associated with the audio file; and playing the prefetched audio file stored in the memory.

6. The method of claim 5, wherein the storing step includes the step of:

storing a current page number of the Web page in the memory in association with the prefetched audio file.

7. The method of claim 5 wherein the memory of the data processing system includes a temporary memory, and wherein the storing step includes the step of storing the prefetched audio file in the temporary memory when there is room in the temporary memory for the prefetched audio file.

8. The method of claim 5 wherein the memory of the data processing system includes a temporary memory, and wherein the storing step includes the step of deleting from the temporary memory a second audio file referenced in a least recently used Web page.

9. The method of claim 5, wherein the portion of the displayed Web page is linked to the prefetched audio file; and wherein the determining step includes the step of determining that the user has selected the portion of the displayed Web page linked with the audio file.

10. A method of specifying an audio file on a Web page, comprising the steps, performed by a data processing system, of:

determining a location of graphic data associated with the audio file on the Web page;

storing in a memory of the data processing system an HTML element having the format:

<A HREF=url SOUND>graphic data </A> where the HTML element is stored in the memory in a location associated with the location of the graphic data on the Web page and the format indicates that an audio file associated with the HTML element is to be prefetched automatically when during a review of HTML describing the Web page the HTML element is located in the HTML.

11. A computer program product, comprising:

a computer usable medium having a computer readable program code mechanism embodied therein configured to display a Web page, the computer readable program code mechanism in said program product including:

a computer readable program code mechanism configured to cause a computer to effect receiving HTML describing the Web page, the HTML containing a SOUND attribute associated with an audio file identifying the audio file associated with the Web page that should be prefetched;

a computer readable program code mechanism configured to cause a computer to effect reviewing the received HTML to locate the SOUND attribute in the HTML;

a computer readable program code mechanism configured to cause the computer to effect prefetching automatically the audio file identified by the SOUND attribute in the HTML when during the review performed by the computer the SOUND attribute is located in the HTML; and a computer readable program code mechanism configured to cause the computer to effect storing the prefetched audio file in a memory of the data processing system to allow the audio file to be played immediately upon activation of the audio file by a user.

12. The computer program product of claim 11, wherein the computer readable program code mechanism in said program product further comprises:

a computer readable program code mechanism configured to cause the computer to effect displaying the Web page in accordance with the HTML;

a computer readable program code mechanism configured to cause the computer to effect determining that a user has selected a portion of the displayed Web page associated with the audio file; and a computer readable program code mechanism configured to cause the computer to effect playing the prefetched audio file stored in the memory.

13. A computer system that processes HTML describing a Web page, the computer system having a memory, comprising:

an HTML receiving portion that receives the HTML describing the Web page, the HTML describing the Web page including at least one SOUND attribute identifying at least one audio file associated with the Web page that should be prefetched;

a reviewing portion that reviews the received HTML to locate the at least one SOUND attribute in the HTML;

a prefetch portion that prefetches automatically the audio file identified by the at least one SOUND attribute when during the review performed by the reviewing portion the SOUND attribute is located in the HTML; and a storage portion that stores the prefetched audio file in the memory of the computer system to allow the audio file to be played immediately upon activation of the audio file by the user.

14. The computer system of claim 13, wherein the storage portion includes a portion that stores a current page number of the Web page in the memory in association with the prefetched audio file.

15. The computer system of claim 13, wherein the memory of the computer system includes a temporary memory, and wherein the storage portion includes a portion that stores the prefetched audio file in the temporary memory when there is room in the temporary memory for the prefetched audio file.

16. The computer system of claim 13, wherein the memory of the computer system includes a temporary memory, wherein the storage portion includes a portion that deletes from the temporary memory a second audio file referenced in a least recently used Web page.

17. A computer readable medium carrying one or more sequences of instructions for processing HTML describing a Web page, wherein execution of the one or more sequences of instructions by one or more processors causes the one or more processors to perform the steps of:

receiving HTML describing the Web page, the HTML describing the Web page including at least one SOUND attribute indicating that at least one audio file associated with the Web page should be prefetched;

reviewing the received HTML to locate the at least one SOUND attribute in the HTML; prefetching automatically the audio file identified by the at least one sound attribute when during the reviewing step the SOUND attribute is located in the HTML; and storing the prefetched audio file in a memory of the data processing system to allow the audio file to be played immediately upon activation of the audio file by a user.

* * * * *